US012730566B2

(12) United States Patent
Hu et al.

(10) Patent No.: US 12,730,566 B2
(45) Date of Patent: Sep. 8, 2026

(54) MEMORY CONTROL METHOD, MEMORY STORAGE DEVICE AND MEMORY CONTROL CIRCUIT UNIT

(71) Applicant: Hefei Kaimeng Technology Co., Ltd., Anhui (CN)

(72) Inventors: Jian Hu, Anhui (CN); Xin Wang, Anhui (CN); Tsung-Lin Wu, Anhui (CN); Qiao Zhu, Anhui (CN); Chong Peng, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 133 days.

(21) Appl. No.: 18/961,456

(22) Filed: Nov. 27, 2024

(65) Prior Publication Data

US 2025/0348230 A1 Nov. 13, 2025

(30) Foreign Application Priority Data

May 13, 2024 (CN) ......................... 202410592928.7

(51) Int. Cl.
*G06F 3/06* (2006.01)

(52) U.S. Cl.
CPC .......... *G06F 3/0619* (2013.01); *G06F 3/0653* (2013.01); *G06F 3/0679* (2013.01); *G06F 2212/7211* (2013.01)

(58) Field of Classification Search
None
See application file for complete search history.

(56) References Cited

U.S. PATENT DOCUMENTS

2017/0277471 A1* 9/2017 Huang .................. G06F 3/0685

* cited by examiner

*Primary Examiner* — Charles J Choi
(74) *Attorney, Agent, or Firm* — JCIPRNET

(57) ABSTRACT

Disclosed are a memory control method, a memory storage device, and a memory control circuit unit. The method is used in a memory storage device including a rewritable non-volatile memory module. The rewritable non-volatile memory module includes virtual management units, each virtual management unit includes physical blocks. The method includes acquiring and utilizing an array to record the read count for virtual management units and the read count for each physical block within each virtual management unit; designating the maximum read count for the physical block with the highest read count within the first virtual management unit as the read count for the first virtual management unit; and, if the read count for the first virtual management unit is greater than or equal to a read count threshold, performing data relocation on the first virtual management unit, or, checking whether the first virtual management unit is unable error correcting code.

18 Claims, 10 Drawing Sheets

Read count for VB

| VB0 | VB1 | ••• | VB0x20 | | ••• | VB Max |
|---|---|---|---|---|---|---|
| 0 | 0 | 0 | 230 | 0 | 0 | 0 |

Read count for PB

| | 0 | 1 | ••• | MAX Support Count |
|---|---|---|---|---|
| PB0 | 100 | 100 | 10 | 10 |
| PB1 | 100 | 230 | 7 | 10 |
| | 90 | 190 | 10 | 10 |
| | 70 | 20 | 0 | 7 |
| | 30 | 30 | 30 | 3 |
| | 60 | 10 | 10 | 17 |
| | 40 | 130 | 10 | 13 |
| PB Max | 25 | 200 | 20 | 20 |
| Corresponding to VB | 1 | 0x20 | 0x50 | 0x60 |

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of China application serial no. 202410592928.7, filed on May 13, 2024. The entirety of the above-mentioned patent application is hereby incorporated by reference herein and made a part of this specification.

BACKGROUND

Technical Field

This disclosure pertains to recording the read counts for physical blocks, and particularly relates to a memory control method, a memory storage device, and a memory control circuit unit.

Description of Related Art

Read count refers to the number of times a physical block has been read, utilized for processes related to read disturbance. Due to the inherent limitations on read and write cycles in flash memory, if some regions of the flash memory are subjected to excessively frequent read and write operations, these regions will deteriorate more rapidly than others, thereby reducing the overall lifespan of the solid-state drive (SSD). When such an affected region is relatively small and the read count becomes sufficiently high, SSDs employing flash memory as their storage medium may experience a malfunction. This malfunction is termed "read disturbance." In the event that the read count for a particular block exceeds a specified threshold (typically several million times), the data stored in the flash memory might become unstable, potentially resulting in uncorrectable errors and consequent data loss.

Due to buffer memory limitations, DRAM-less flash controllers typically record read counts on a virtual block (VB) basis. Each read operation of any physical block within this VB incrementally augments the read count for the entire VB. In other words, the current methodology aggregates the total read count of all physical blocks within a given VB and designates this sum as the read count for the VB in question.

The above method of recording read counts in units of VB presents the following issues. For instance, the read disturbance may be set to check whether a virtual management unit (VB) generates an Unable Error Correcting Code (UECC) or uncorrectable error after the virtual management unit is read 10,000 times. In this embodiment, one VB may include multiple physical blocks. For example, virtual management unit VB1 may include 10 physical blocks (PB1 to PB10). When the read count of virtual management unit VB1 reaches 10,000, the read count of each physical block (PB1, PB2 . . . or PB10) included in virtual management unit VB1 may only be 1,000. This scenario may lead to scanning virtual management unit VB1 to check for UECC before reaching the expected threshold for scanning, or relocating data from virtual management unit VB1 to another new virtual management unit VB2 before reaching the expected threshold for data relocation. Consequently, this results in frequent triggering of virtual management unit scanning or data relocation operations for virtual management units, leading to inefficient processing by the flash controller and shortening the lifespan of the flash memory.

SUMMARY

The present disclosure provides a memory control method, a memory storage device, and a memory control circuit unit, which may effectively prevent frequent triggering of Uncorrectable Error Correction Code (UECC) operations on virtual management units by the memory management circuit, or prevent frequent triggering of data relocation operations on virtual management units by the memory management circuit.

The exemplary embodiment of the present disclosure provides a memory control method for use in a memory storage device. The memory storage device includes a rewritable non-volatile memory module, wherein the rewritable non-volatile memory module includes multiple virtual management units, each of the virtual management units includes multiple physical blocks. The memory control method includes acquiring and utilizing an array to record the read count for multiple virtual management units and the read count for each of the physical blocks within each of the virtual management units; designating the maximum read count for the physical block with the highest read count within the first virtual management unit among the multiple virtual management units as the read count for the first virtual management unit; and, if the read count for the first virtual management unit is greater than or equal to a read count threshold, performing data relocation on the first virtual management unit, or, alternatively, checking whether the first virtual management unit is unable error correcting code (UECC).

In an exemplary embodiment of the present disclosure, the memory control method further includes: establishing an array of n columns*i rows, wherein i represents the number of multiple physical blocks included in each of the virtual management units, n represents the maximum support count of the virtual management units of the buffer memory used for temporarily storing read counts, n is greater than or equal to 1 and less than or equal to the number of multiple virtual management units, and both i and n are positive integers.

In an exemplary embodiment of the present disclosure, the array is a 1-byte unsigned byte array.

In an exemplary embodiment of the present disclosure, the step of acquiring and utilizing an array to record the read count for multiple virtual management units and the read count for each of the physical blocks within each of the virtual management units further includes: when the number of virtual management units for which read count is to be recorded is less than the maximum support count of the virtual management units, utilizing the n-th column of the array to record the read count for the (n+1)-th read first virtual management unit among the multiple virtual management units, and recording the sequence number of the first virtual management unit; and updating the read count for the first virtual management unit to the n-th column of the array based on the sequence number of the first virtual management unit.

In an exemplary embodiment of the present disclosure, the step of acquiring and utilizing the array to record the read count for multiple virtual management units and the read count for each of the physical blocks within each of the virtual management units further includes: when utilizing the n-th column of the array to record the read count for the (n+1)-th read first virtual management unit among the multiple virtual management units, utilizing the i-th row and n-th column of the array to record the read count for the i-th physical block among the multiple physical blocks included in the first virtual management unit; and if the read count recorded in the i-th row and n-th column of the array is greater than the array record threshold, updating the read count recorded in the i-th row and n-th column to the read count for the first virtual management unit, clearing the recorded read count for each of the physical blocks of the first virtual management unit in the n-th column of the array, and designating the first virtual management unit as a reference value.

In an exemplary embodiment of the present disclosure, the step of acquiring and utilizing the array to record the read count for the multiple virtual management units and the read count for each of the physical blocks within each of the virtual management units further includes: when the number of the virtual management units for which read count is to be recorded equals the maximum support count of the virtual management units, and a newly added virtual management unit is to be read, updating the maximum read count recorded in the array to the read count for a second virtual management unit among the multiple virtual management units, clearing the read count for each of the physical blocks within the second virtual management unit recorded in the M-th column used to record the second virtual management unit, and utilizing the M-th column to record the read count for each of the physical blocks within the newly added virtual management unit, wherein M is greater than or equal to 0 and less than or equal to n−1.

An exemplary embodiment of the present disclosure provides a memory storage device, including: a connection interface unit, configured to connect to a host system; a rewritable non-volatile memory module, wherein the rewritable non-volatile memory module includes multiple virtual management units, each of the virtual management units includes multiple physical blocks; and a memory control circuit unit, connected to the connection interface unit and the rewritable non-volatile memory module, wherein the memory control circuit unit is configured to obtain and utilize an array to record the read count for the multiple virtual management units and the read count for each of the physical blocks within each of the virtual management units, wherein the memory control circuit unit is configured to designate the maximum read count for the physical block with the highest read count within a first virtual management unit among the multiple virtual management units as the read count for the first virtual management unit; and if the read count for the first virtual management unit is greater than or equal to a read count threshold, the memory control circuit unit is configured to perform data relocation on the first virtual management unit, or, the memory control circuit unit is configured to check whether the first virtual management unit is unable error correcting code (UECC).

In an exemplary embodiment of the present disclosure, the memory control circuit unit is further configured to establish an array of n columns*i rows, wherein i represents the number of physical blocks included in each of the virtual management units, n represents the maximum support count of the virtual management units of the buffer memory for temporarily storing read counts, n is greater than or equal to 1 and less than or equal to the number of multiple virtual management units, and both i and n are positive integers.

In an exemplary embodiment of the present disclosure, the array is a 1-byte unsigned byte array.

In an exemplary embodiment of the present disclosure, in the operation where the memory control circuit unit is configured to obtain and utilize the array to record the read count for the multiple virtual management units and the read count for each of the physical blocks within each of the virtual management units, when the number of virtual management units for which read count is to be recorded is less than the maximum support count of the virtual management units, the memory control circuit unit is further configured to utilize the i-th column of the array to record the read count for the n+1-th read first virtual management unit among the multiple virtual management units, as well as to record the sequence number of the first virtual management unit. Additionally, the memory control circuit unit is further configured to update the read count for the first virtual management unit to the i-th column of the array based on the sequence number of the first virtual management unit.

In an exemplary embodiment of the present disclosure, in the operation where the memory control circuit unit is configured to acquire and utilize the array to record the read count for multiple virtual management units and the read count for each of the physical blocks within each of the virtual management units, when utilizing the i-th column of the array to record the read count for the (n+1)-th read first virtual management unit among the multiple virtual management units, the memory control circuit unit is further configured to utilize the i-th row and n-th column of the array to record the read count for the i-th physical block among the multiple physical blocks included in the first virtual management unit; and if the read count recorded in the i-th row and n-th column of the array is greater than the array record threshold, the memory control circuit unit is further configured to update the read count recorded in the i-th row and n-th column to the read count for the first virtual management unit, clear the recorded read count for each of the physical blocks of the first virtual management unit in the i-th column of the array, and designate the first virtual management unit as a reference value.

In an exemplary embodiment of the present disclosure, in the operation where the memory control circuit unit is configured to acquire and utilize the array to record the read count for the multiple virtual management units and the read count for each of the physical blocks within each of the virtual management units, when the number of the virtual management units for which read count is to be recorded equals the maximum support count of the virtual management units, and a newly added virtual management unit is to be read, the memory control circuit unit is further configured to update the maximum read count recorded in the array to the read count for a second virtual management unit among the multiple virtual management units, clear the read count for each of the physical blocks within the second virtual management unit recorded in the M-th column used to record the second virtual management unit, and utilize the M-th column to record the read count for each of the physical blocks within the newly added virtual management unit, wherein M is greater than or equal to 0 and less than or equal to n−1.

An exemplary embodiment of the present disclosure provides a memory control circuit unit, including: a host interface, configured to connect to a host system; a memory interface, connected to a rewritable non-volatile memory module, wherein the rewritable non-volatile memory module includes multiple virtual management units, each of the virtual management units includes multiple physical blocks; and a memory management circuit, connected to the host interface and the memory interface, wherein the memory management circuit is configured to obtain and utilize an array to record the read count for the multiple virtual management units and the read count for each of the physical blocks within each of the virtual management units, wherein the memory management circuit is configured to designate the maximum read count for the physical block with the highest read count within a first virtual management unit among the multiple virtual management units as the read count for the first virtual management unit; and if the read count for the first virtual management unit is greater than or equal to a read count threshold, the memory management circuit is configured to perform data relocation on the first virtual management unit, or, the memory management circuit is configured to check whether the first virtual management unit is unable error correcting code (UECC).

In an exemplary embodiment of the present disclosure, the memory management circuit is further configured to establish an array of n columns*i rows, wherein i represents the number of multiple physical blocks included in each of the virtual management units, n represents the maximum support count of the virtual management units of the buffer memory used for temporarily storing read counts, n is greater than or equal to 1 and less than or equal to the number of multiple virtual management units, and both i and n are positive integers.

In an exemplary embodiment of the present disclosure, the array is a 1-byte unsigned byte array.

In an exemplary embodiment of the present disclosure, in the operation where the memory management circuit is configured to acquire and utilize an array to record the read count for multiple virtual management units and the read count for each of the physical blocks within each of the virtual management units, when the number of virtual management units for which read count is to be recorded is less than the maximum support count of the virtual management units, the memory management circuit is further configured to utilize the i-th column of the array to record the read count for the (n+1)-th read first virtual management unit among the multiple virtual management units, and record the sequence number of the first virtual management unit; and the memory management circuit is further configured to update the read count for the first virtual management unit to the i-th column of the array based on the sequence number of the first virtual management unit.

In an exemplary embodiment of the present disclosure, in the operation where the memory management circuit is configured to acquire and utilize the array to record the read count for multiple virtual management units and the read count for each of the physical blocks within each of the virtual management units, when utilizing the i-th column of the array to record the read count for the (n+1)-th read first virtual management unit among the multiple virtual management units, the memory management circuit is further configured to utilize the i-th row and i-th column of the array to record the read count for the i-th physical block among the multiple physical blocks included in the first virtual management unit; and if the read count recorded in the i-th row and i-th column of the array is greater than the array record threshold, the memory management circuit is further configured to update the read count recorded in the i-th row and i-th column to the read count for the first virtual management unit, clear the recorded read count for each of the physical blocks of the first virtual management unit in the i-th column of the array, and designate the first virtual management unit as a reference value.

In an exemplary embodiment of the present disclosure, in the operation where the memory management circuit is configured to acquire and utilize the array to record the read count for the multiple virtual management units and the read count for each of the physical blocks within each of the virtual management units, when the number of the virtual management units for which read count is to be recorded equals the maximum support count of the virtual management units, and a newly added virtual management unit is to be read, the memory management circuit is further configured to update the maximum read count recorded in the array to the read count for a second virtual management unit among the multiple virtual management units, clear the read count for each of the physical blocks within the second virtual management unit recorded in the M-th column used to record the second virtual management unit, and utilize the M-th column to record the read count for each of the physical blocks within the newly added virtual management unit, wherein M is greater than or equal to 0 and less than or equal to n−1.

Based on the foregoing, the present disclosure provides a memory control method, a memory storage device, and a memory control circuit unit, which not only effectively avoids frequent triggering of the memory management circuit to perform UECC on the virtual management units, or avoids frequent triggering of the memory management circuit to perform data relocation on the virtual management units, but also improves the read performance of the flash memory device and extends the service life thereof.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the present disclosure.

DESCRIPTION OF THE EMBODIMENTS

Figure 1:
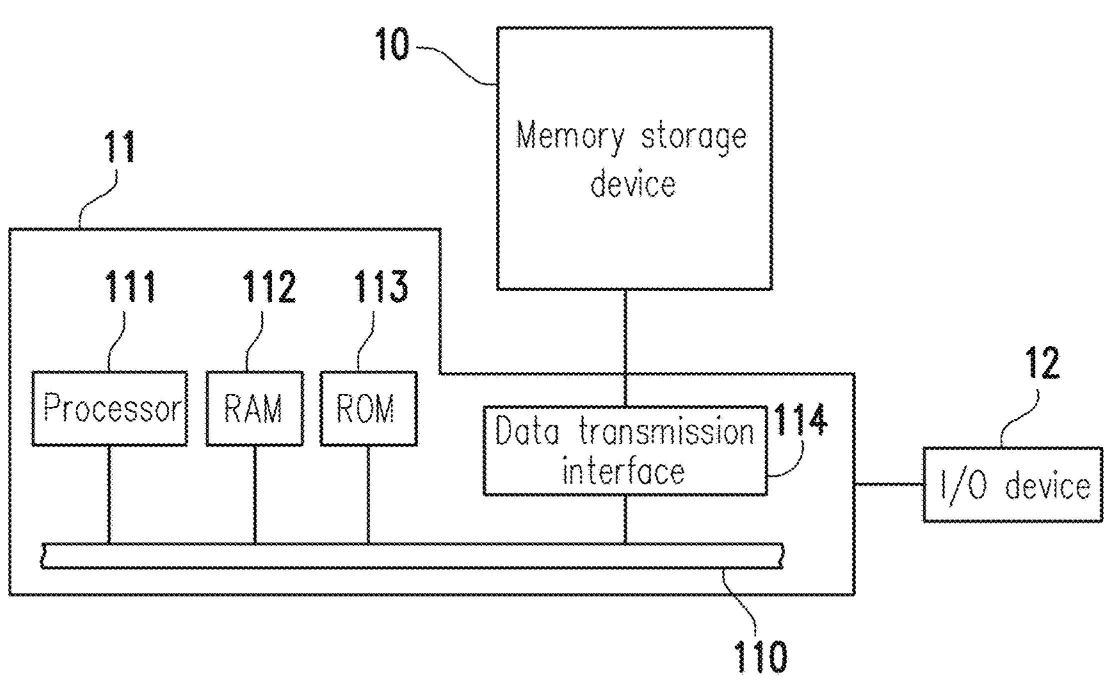
FIG. 1 is a schematic diagram of a host system, a memory storage device, and an input/output (I/O) device according to an exemplary embodiment of the present disclosure.

Reference shall now be made in detail to exemplary embodiments of the present disclosure, examples of which are illustrated in the accompanying drawings. Where possible, the same reference numerals are used throughout the drawings and the description to refer to the same or like parts.

Generally speaking, a memory storage device (also known as a memory storage system) includes a rewritable non-volatile memory module and a controller (also referred to as a control circuit). The memory storage device may be used in conjunction with a host system, enabling the host system to write data to or read data from the memory storage device.

Figure 2:
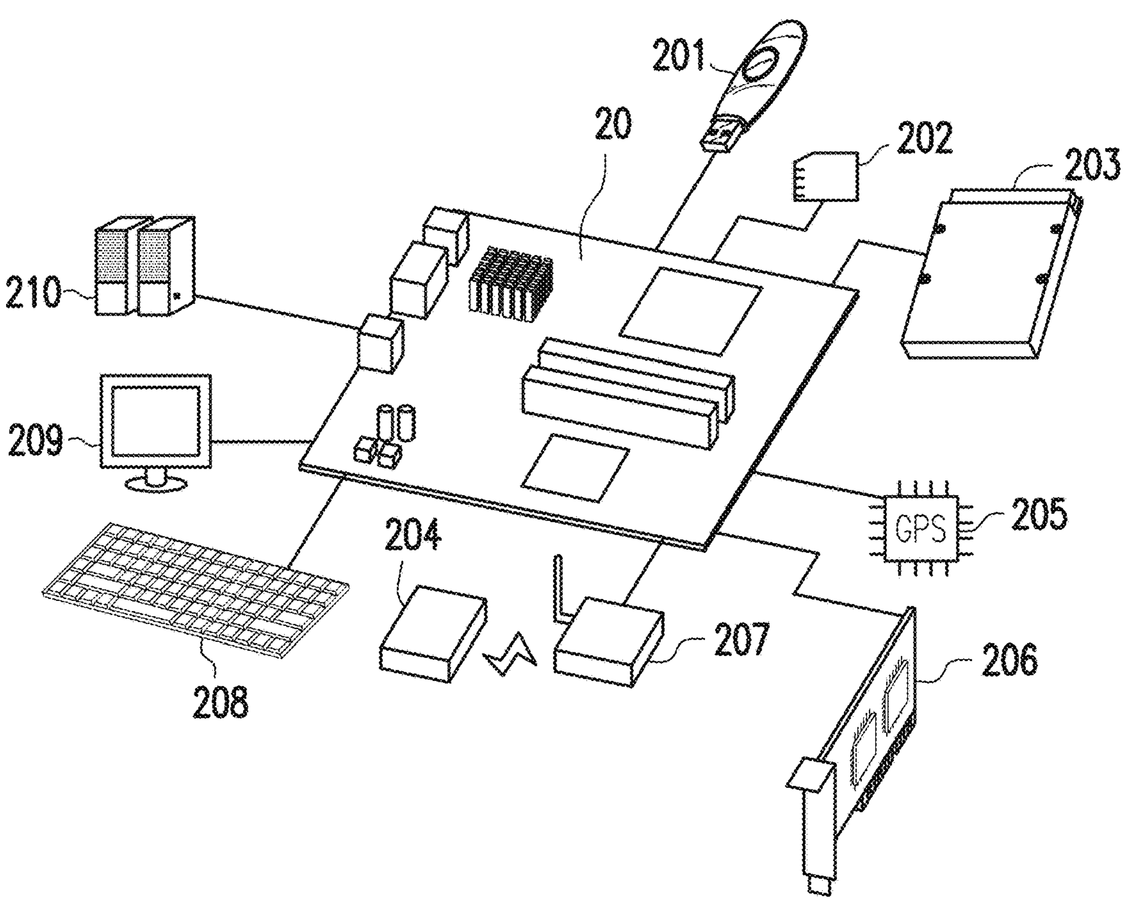
FIG. 2 is a schematic diagram of a host system, a memory storage device, and an I/O device according to an exemplary embodiment of the present disclosure.

FIG. 1 is a schematic diagram of a host system, a memory storage device, and an input/output (I/O) device according to an exemplary embodiment of the present disclosure. FIG. 2 is a schematic diagram of a host system, a memory storage device, and an I/O device according to an exemplary embodiment of the present disclosure.

Please refer to FIG. 1 and FIG. 2. The host system 11 may include a processor 111, a random access memory (RAM) 112, a read-only memory (ROM) 113, and a data transmission interface 114. The processor 111, the random access memory 112, the read-only memory 113, and the data transmission interface 114 may be connected to a system bus 110.

In an exemplary embodiment, the host system 11 may be connected to the memory storage device 10 through the data transmission interface 114. For instance, the host system 11 may, through the data transmission interface 114, store data to the memory storage device 10 or read data from the memory storage device 10. Furthermore, the host system 11 may be connected to the I/O device 12 through the system bus 110. For example, the host system 11 may, through the system bus 110, transmit output signals to the I/O device 12 or receive input signals from the I/O device 12.

In an exemplary embodiment, the processor 111, the random access memory 112, the read-only memory 113, and the data transmission interface 114 may be disposed on the motherboard 20 of the host system 11. The number of the data transmission interfaces 114 may be one or more. Through the data transmission interface 114, the motherboard 20 may be connected to the memory storage device 10 via wired or wireless means.

In an exemplary embodiment, the memory storage device 10 may be, for example, a USB flash drive 201, a memory card 202, a Solid State Drive (SSD) 203, or a wireless storage device 204. The wireless storage device 204 may be, for instance, a Near Field Communication (NFC) storage device, a WiFi storage device, a Bluetooth storage device, or a low-energy Bluetooth storage device (e.g., iBeacon), or other storage devices based on various wireless communication technologies. Furthermore, the motherboard 20 may also be connected via the system bus 110 to various I/O devices such as a Global Positioning System (GPS) module 205, a network interface card 206, a wireless transmission device 207, a keyboard 208, a display 209, and a speaker 210. For example, in an exemplary embodiment, the motherboard 20 may access the wireless storage device 204 through the wireless transmission device 207.

In an exemplary embodiment, the host system 11 is a computer system. In another exemplary embodiment, the host system 11 may be any system capable of substantially cooperating with a memory storage device to store data.

Figure 3:
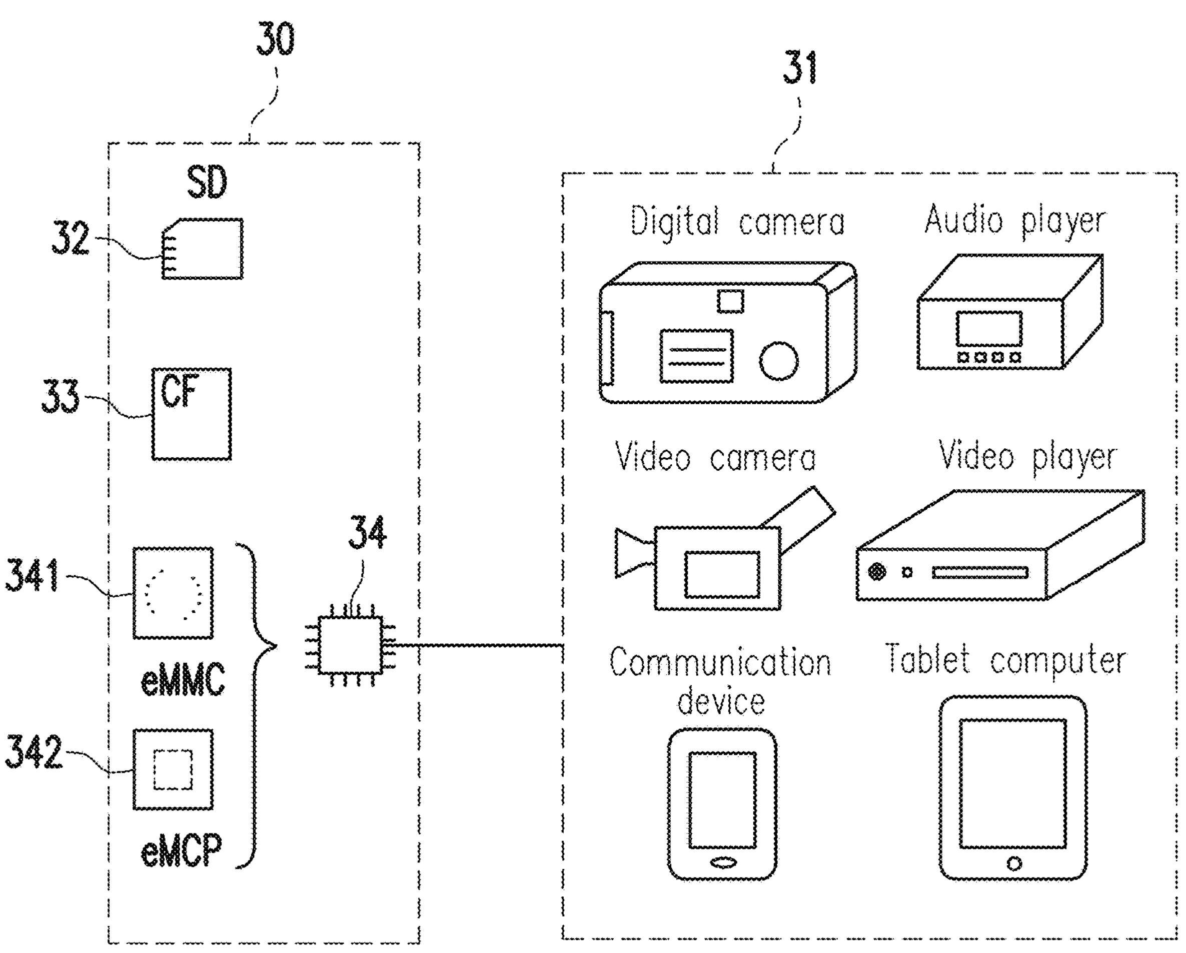
FIG. 3 is a schematic diagram of a host system and a memory storage device according to an exemplary embodiment of the present disclosure.

FIG. 3 is a schematic diagram of a host system and a memory storage device according to an exemplary embodiment of the present disclosure. Please refer to FIG. 3. In an exemplary embodiment, the host system 31 may be systems such as a digital camera, a video camera, a communication device, an audio player, a video player, or a tablet computer. The memory storage device 30 may be various types of non-volatile memory storage devices utilized by the host system 31, including a Secure Digital (SD) card 32, a Compact Flash (CF) card 33, or an embedded storage device 34. The embedded storage device 34 encompasses various types of embedded memory devices that connect memory modules directly to a substrate on a host system, including but not limited to an embedded Multi Media Card (eMMC) 341 and/or an embedded Multi Chip Package (eMCP) storage device 342.

Figure 4:
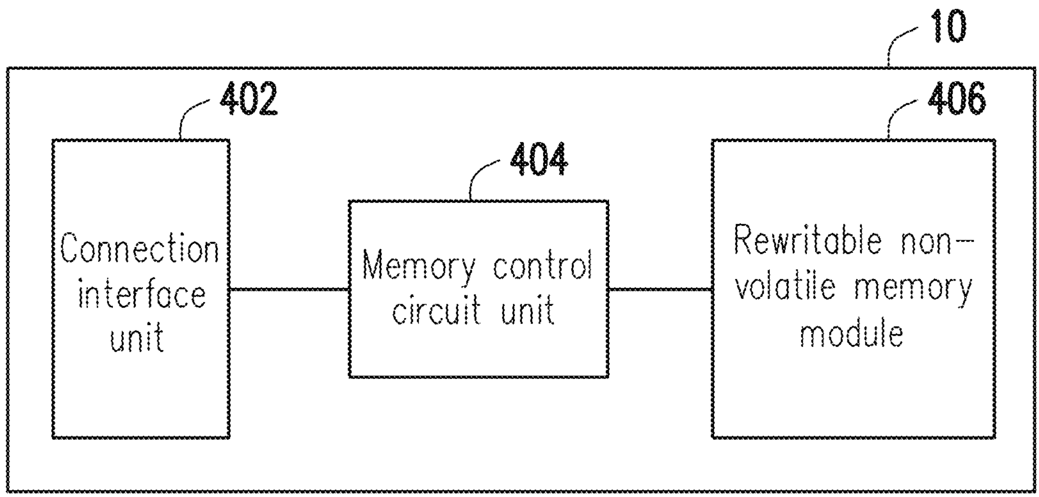
FIG. 4 is a schematic block diagram of a memory storage device according to an exemplary embodiment of the present disclosure.

FIG. 4 is a schematic block diagram of a memory storage device according to an exemplary embodiment of the present disclosure. With reference to FIG. 4, the memory storage device 10 includes a connection interface unit 402, a memory control circuit unit 404, and a rewritable non-volatile memory module 406.

The connection interface unit 402 is utilized to connect the memory storage device 10 to the host system 11. The memory storage device 10 may communicate with the host system 11 through the connection interface unit 402. In an exemplary embodiment, the connection interface unit 402 is compatible with the Peripheral Component Interconnect Express (PCI Express) standard. However, it should be understood that the present disclosure is not limited thereto, and the connection interface unit 402 may also conform to standards such as Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be packaged in a single chip with the memory control circuit unit 404, or the connection interface unit 402 may be disposed external to a chip containing the memory control circuit unit 404.

The memory control circuit unit 404 is connected to the connection interface unit 402 and the rewritable non-volatile memory module 406. The memory control circuit unit 404 is configured to execute multiple logic gates or control instructions implemented in hardware or firmware form, and to perform operations such as writing, reading, and erasing data in the rewritable non-volatile memory module 406 in accordance with instructions from the host system 11.

The rewritable non-volatile memory module 406 is utilized for storing data written by the host system 11. The rewritable non-volatile memory module 406 may include Single Level Cell (SLC) NAND flash memory modules (i.e., flash memory modules capable of storing 1 bit per storage unit), Multi Level Cell (MLC) NAND flash memory modules (i.e., flash memory modules capable of storing 2 bits per storage unit), Triple Level Cell (TLC) NAND flash memory modules (i.e., flash memory modules capable of storing 3 bits per storage unit), Quad Level Cell (QLC) NAND flash memory modules (i.e., flash memory modules capable of storing 4 bits per storage unit), other flash memory modules, or other memory modules with similar characteristics.

Each storage unit in the rewritable non-volatile memory module 406 stores one or more bits through changes in voltage (hereinafter also referred to as threshold voltage). Specifically, each storage unit includes a charge trapping layer between the control gate and the channel. By applying a write voltage to the control gate, the quantity of electrons in the charge trapping layer may be altered, thereby modifying the threshold voltage of the storage unit. This operation of altering the threshold voltage of the storage unit is also referred to as "writing data to the storage unit" or "programming the storage unit". As a result of the threshold voltage changes, each storage unit in the rewritable non-volatile memory module 406 possesses multiple storage states. By applying a read voltage, it is possible to determine which storage state a storage unit belongs to, thereby retrieving the one or more bits stored in the storage unit.

In an exemplary embodiment, the storage units of the rewritable non-volatile memory module 406 may constitute multiple physical programming units, and the physical programming units may constitute multiple physical erasing units. Specifically, storage units on the same word line may form one or more physical programming units. If each storage unit may store two or more bits, the physical programming units on the same word line may be at least classified into lower physical programming units and upper physical programming units. For example, the Least Significant Bit (LSB) of a storage unit belongs to the lower physical programming unit, while the Most Significant Bit (MSB) of a storage unit belongs to the upper physical programming unit. Generally, in the MLC NAND flash memory, the writing speed of the lower physical programming units is greater than that of the upper physical programming units, and/or the reliability of the lower physical programming units is higher than that of the upper physical programming units.

In an exemplary embodiment, the physical programming unit represents the minimum unit of programming. That is, the physical programming unit is the smallest unit for writing data. For instance, the physical programming unit may be a physical page or a physical sector. If the physical programming unit is a physical page, the physical programming units may include a data bit region and a redundancy bit region. The data bit region includes multiple physical sectors for storing user data, while the redundancy bit region is configured to store system data (e.g., error correction codes and other management data). In an exemplary embodiment, the data bit region contains 32 physical sectors, and each physical sector has a size of 512 bytes (B). However, in other exemplary embodiments, the data bit region may contain 8, 16, or more or less physical sectors, and each physical sector may be larger or smaller in size. On the other hand, the physical erasing unit represents the minimum unit of erasing operation. In other words, each physical erasing unit contains the minimum number of storage units that are erased simultaneously. For example, the physical erasing unit may be a physical block.

Figure 5:
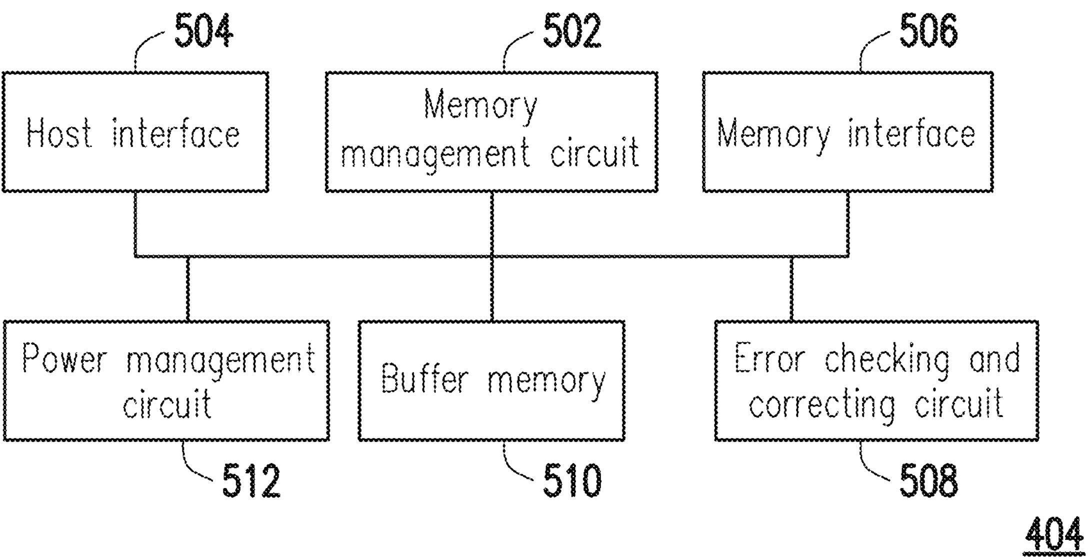
FIG. 5 is a schematic block diagram of a memory control circuit unit according to an exemplary embodiment of the present disclosure.

FIG. 5 is a schematic block diagram of a memory control circuit unit according to an exemplary embodiment of the present disclosure. Referring to FIG. 5, the memory control circuit unit 404 includes a memory management circuit 502, a host interface 504, a memory interface 506, and an error checking and correction circuit 508.

The memory management circuit 502 is configured to control the overall operation of the memory control circuit unit 404. Specifically, the memory management circuit 502 has multiple control instructions, which are executed during the operation of the memory storage device 10 to perform operations such as data writing, reading, and erasing. Hereinafter, when describing the operations of the memory management circuit 502, it shall be deemed equivalent to describing the operations of the memory control circuit unit 404.

In an exemplary embodiment, the control instructions of the memory management circuit 502 are implemented in the form of firmware. For instance, the memory management circuit 502 has a microprocessor unit (not shown) and a read-only memory (not shown), wherein the control instructions are burned into the read-only memory. During the operation of the memory storage device 10, the control instructions are executed by the microprocessor unit to perform operations such as data writing, reading, and erasing.

In an exemplary embodiment, the control instructions of the memory management circuit 502 may also be stored in the form of program code in a specific region (e.g., a system region dedicated to storing system data in the memory module) of the rewritable non-volatile memory module 406. Furthermore, the memory management circuit 502 has a microprocessor unit (not shown), a read-only memory (ROM) (not shown), and a random access memory (RAM) (not shown). Specifically, the ROM contains boot code, and when the memory control circuit unit 404 is enabled, the microprocessor unit first executes the boot code to load the control instructions stored in the rewritable non-volatile memory module 406 into the RAM of the memory management circuit 502. Subsequently, the microprocessor unit executes the control instructions to perform operations such as data writing, reading, and erasing.

In an exemplary embodiment, the control instructions of the memory management circuit 502 may also be implemented in the form of hardware. For instance, the memory management circuit 502 includes a microcontroller, a storage unit management circuit, a memory write circuit, a memory read circuit, a memory erase circuit, and a data processing circuit. The storage unit management circuit, the memory write circuit, the memory read circuit, the memory erase circuit, and the data processing circuit are connected to the microcontroller. The storage unit management circuit is configured to manage the storage units or storage unit groups of the rewritable non-volatile memory module 406. The memory write circuit is employed to issue write instruction sequences to the rewritable non-volatile memory module 406 for writing data into the rewritable non-volatile memory module 406. The memory read circuit is configured to issue read instruction sequences to the rewritable non-volatile memory module 406 for reading data from the rewritable non-volatile memory module 406. The memory erase circuit is configured to issue erase instruction sequences to the rewritable non-volatile memory module 406 for erasing data from the rewritable non-volatile memory module 406. The data processing circuit is employed to process data to be written into the rewritable non-volatile memory module 406 and data read from the rewritable non-volatile memory module 406. The write instruction sequences, the read instruction sequences, and the erase instruction sequences may each include one or more program codes or instruction codes and are configured to instruct the rewritable non-volatile memory module 406 to execute corresponding write, read, and erase operations. In an exemplary embodiment, the memory management circuit 502 may also issue other types of instruction sequences to the rewritable non-volatile memory module 406 to instruct the execution of corresponding operations.

The host interface 504 is connected to the memory management circuit 502. The memory management circuit 502 may communicate with the host system 11 through the host interface 504. The host interface 504 may be configured to receive and identify instructions and data transmitted from the host system 11. For example, instructions and data transmitted from the host system 11 may be transmitted to the memory management circuit 502 through the host interface 504. Furthermore, the memory management circuit 502 may transmit data to the host system 11 through the host interface 504. In this exemplary embodiment, the host interface 504 is compatible with the PCI Express standard. However, it should be understood that the present disclosure is not limited thereto, and the host interface 504 may also be compatible with SATA standard, PATA standard, IEEE 1394 standard, USB standard, SD standard, UHS-I standard, UHS-II standard, MS standard, MMC standard, eMMC standard, UFS standard, CF standard, IDE standard, or other suitable data transmission standards.

The memory interface 506 is connected to the memory management circuit 502 and is utilized for accessing the rewritable non-volatile memory module 406. Specifically, data intended for writing to the rewritable non-volatile memory module 406 is converted through the memory interface 506 into a format acceptable by the rewritable non-volatile memory module 406. In particular, when the memory management circuit 502 needs to access the rewritable non-volatile memory module 406, the memory interface 506 transmits corresponding instruction sequences. For instance, the instruction sequences may include write instruction sequences for indicating data writing, read instruction sequences for indicating data reading, erase instruction sequences for indicating data erasure, and corresponding instruction sequences for various memory operations (e.g., changing read voltage levels or executing garbage collection operations, etc.). The instruction sequences are, for example, generated by the memory management circuit 502 and transmitted to the rewritable non-volatile memory module 406 through the memory interface 506. The instruction sequences may include one or more signals, or data on a bus. The signals or data may include instruction codes or program codes. For example, a read instruction sequence may include information such as a read identification code and memory address.

The error checking and correction circuit 508 is connected to the memory management circuit 502 and is configured to perform error checking and correction operations to ensure data integrity. Specifically, when the memory management circuit 502 receives a write instruction from the host system 11, the error checking and correction circuit 508 generates corresponding error correcting code (ECC) and/or error detecting code (EDC) for the data corresponding to the write instruction. Subsequently, the memory management circuit 502 writes the data corresponding to the write instruction, along with the corresponding error correcting code and/or error detecting code, to the rewritable non-volatile memory module 406. Subsequently, when the memory management circuit 502 reads data from the rewritable non-volatile memory module 406, the memory management circuit 502 simultaneously reads the error correcting code and/or error detecting code corresponding to the data, and the error checking and correction circuit 508 then performs error checking and correction operations on the read data based on the error correcting code and/or error detecting code.

In an exemplary embodiment, the memory control circuit unit 404 further includes a buffer memory 510 and a power management circuit 512. The buffer memory 510 is connected to the memory management circuit 502 and is configured for temporarily storing data and instructions from the host system 11 or data from the rewritable non-volatile memory module 406. The power management circuit 512 is connected to the memory management circuit 502 and is employed to control the power supply of the memory storage device 10.

In an exemplary embodiment, the buffer memory 510 may be configured to temporarily store system parameters of the memory storage device 10, such as the number of programming operations, erase operations, and/or read counts for at least a portion of the physical units in the rewritable non-volatile memory module 406.

In an exemplary embodiment, the memory storage device 10 shown in FIG. 4, also referred to as a flash memory storage device, includes a rewritable non-volatile memory module 406, also referred to as a flash memory module, and a memory control circuit unit 404, also referred to as a flash memory controller. In an exemplary embodiment, the memory management circuit 502 shown in FIG. 5 is also referred to as a flash memory management circuit.

Figure 6:
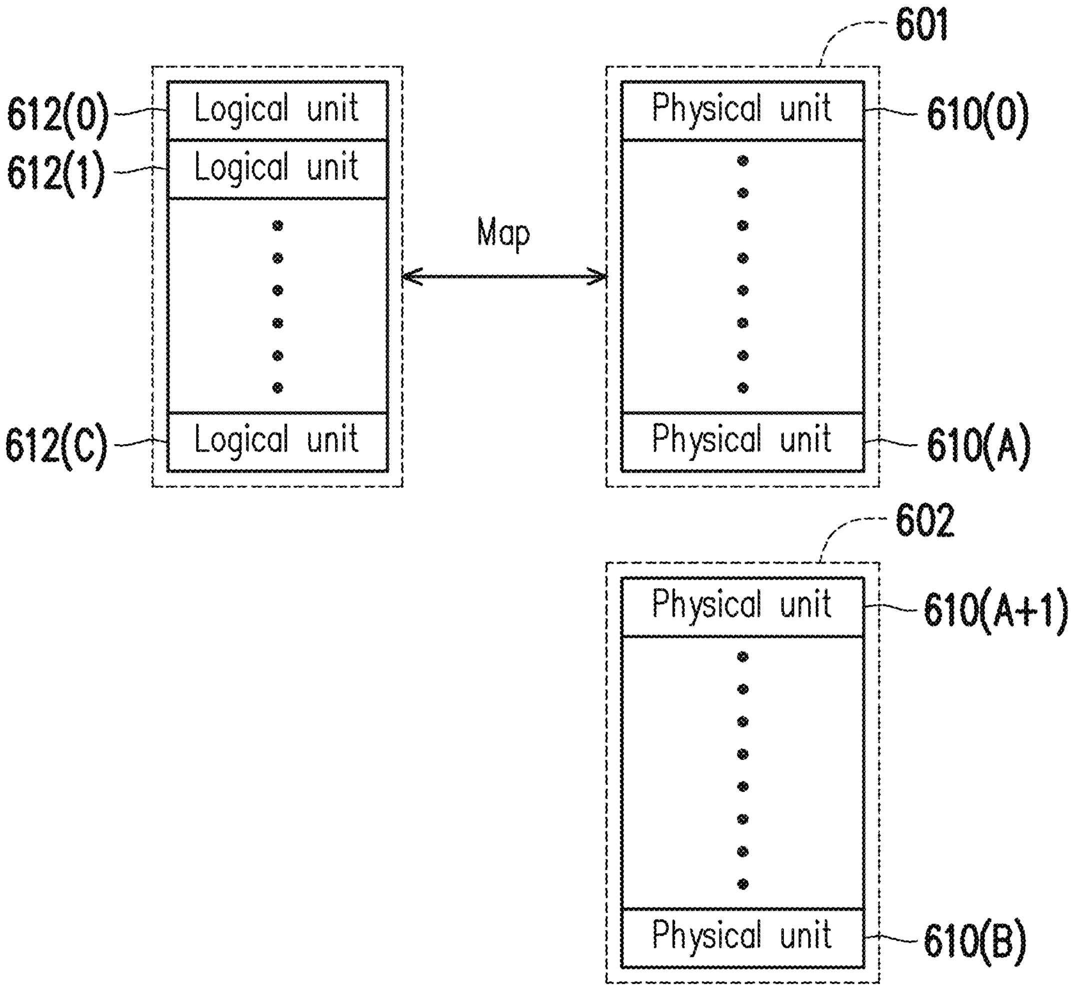
FIG. 6 is a schematic diagram of managing a rewritable non-volatile memory module according to an exemplary embodiment of the present disclosure.

FIG. 6 is a schematic diagram of managing a rewritable non-volatile memory module according to an exemplary embodiment of the present disclosure. Referring to FIG. 6, the memory management circuit 502 may logically group the physical units 610(0) to 610(B) in the rewritable non-volatile memory module 406 into a storage region 601 and a spare region 602. In an exemplary embodiment, a physical unit refers to a physical address or a physical programming unit. In another exemplary embodiment, a physical unit may also be composed of multiple continuous or discontinuous physical addresses.

The physical units 610(0) to 610(A) in the storage region 601 are configured for storing user data (for example, user data from the host system 11 in FIG. 1). For instance, the physical units 610(0) to 610(A) in the storage region 601 may store both valid and invalid data. The physical units 610(A+1) to 610(B) in the spare region 602 do not store data (for example, valid data). In the event that a physical unit does not store valid data, the physical unit may be associated with (or added to) the spare region 602. Furthermore, the physical units in the spare region 602 (or physical units not storing valid data) may be erased. When writing new data, a physical unit may be extracted from the spare region 602 to store said new data. In an exemplary embodiment, the spare region 602 is also referred to as a free pool.

The memory management circuit 502 may be configured with logical units 612(0) to 612(C) to map physical units 610(0) to 610(A) in the storage region 601. In an exemplary embodiment, each logical unit corresponds to one logical address. For instance, a logical address may include one or more Logical Block Addresses (LBAs) or other logical management units. In an exemplary embodiment, one logical unit may also correspond to one logical programming unit or consist of multiple continuous or discontinuous logical addresses. Furthermore, one logical unit may be mapped to one or more physical units. It should be noted that if a physical unit is currently mapped by a logical unit, it indicates that the data currently stored in the physical unit is valid data. Conversely, if a physical unit is not currently mapped by any logical unit, it indicates that the data currently stored in the physical unit is invalid data.

The memory management circuit 502 is capable of recording management data, also referred to as logical-to-physical mapping information, which describes the mapping relationship between logical units and physical units, in at least one logical-to-physical mapping table. When the host system 11 intends to read data from or write data to the memory storage device 10, the memory management circuit 502 may execute data access operations on the memory storage device 10 based on this logical-to-physical mapping table.

In an exemplary embodiment, the rewritable non-volatile memory module 406 may include multiple dies and possess multiple planes, with each plane belonging to a die. In the exemplary embodiment, the number of planes may be greater than the number of dies. That is to say, two or more planes may belong to a single die. Each plane may include multiple physical erasing units (physical blocks) and multiple physical programming units, with the multiple physical programming units combining to form a physical block.

In an exemplary embodiment, the memory management circuit 502 combines multiple physical blocks into a minimum management unit (virtual management unit), and multiple physical blocks within the same virtual management unit may be erased simultaneously. The rewritable non-volatile memory module 406 includes multiple virtual management units. Each of the multiple physical blocks included in each of the virtual management units belongs to a different plane.

The memory management circuit 502 is capable of detecting system parameters of the memory storage device 10. The system parameters may reflect the degree of wear of the rewritable non-volatile memory module 406. For instance, prior to the dispatch of the rewritable non-volatile memory module 406 from the manufacturing facility, the degree of wear of the rewritable non-volatile memory module 406 may be relatively low, and the individual storage units within the rewritable non-volatile memory module 406 may be in a comparatively healthy state. Subsequent to the dispatch of the rewritable non-volatile memory module 406 from the manufacturing facility, in response to an increase in the duration and/or frequency of usage of the rewritable non-volatile memory module 406, the degree of wear of the rewritable non-volatile memory module 406 may progressively increase, and the health status of the individual storage units within the rewritable non-volatile memory module 406 may gradually deteriorate.

In an exemplary embodiment, the degree of wear of the rewritable non-volatile memory module 406 may be influenced by the number of program cycles, erase cycles, and/or read count of at least a portion of the physical units in the rewritable non-volatile memory module 406. For instance, in response to an increase in the number of program cycles, erase cycles, and/or read count of the at least a portion of the physical units in the rewritable non-volatile memory module 406, the degree of wear of the rewritable non-volatile memory module 406 may correspondingly increase. Furthermore, in response to an increase in the degree of wear of the rewritable non-volatile memory module 406, the reliability of the data stored in the rewritable non-volatile memory module 406 may also decline. Once the reliability of the data stored in the rewritable non-volatile memory module 406 declines, the Bit Error Rate (BER) of the data read from the rewritable non-volatile memory module 406 may also increase (indicating an increase in the number of erroneous bits in the read data).

In an exemplary embodiment, the system parameters may include one or more count values. The count values may reflect the degree of wear (also referred to as the degree of usage) of at least one physical unit in the rewritable non-volatile memory module 406. For instance, the count values may include at least one of program count values, erase count values, read count values, and bit error rates or a combination of the above. The program count values may reflect the number of times programming operations have been executed on the at least one physical unit. The erase count values may reflect the number of times erase operations have been executed on the at least one physical unit. The read count values may reflect the number of times read operations have been executed on the at least one physical unit. The bit error rate may reflect the bit error rate of the at least one physical unit or of the data read from the at least one physical unit. It should be noted that in an exemplary embodiment, the system parameters may further include other types of count values, provided that they are able to reflect the degree of wear of at least one physical unit in the rewritable non-volatile memory module 406.

In an exemplary embodiment, the memory management circuit 502 may obtain or evaluate the degree of wear of the rewritable non-volatile memory module 406 based on the system parameters. For instance, the count value may be positively correlated with the degree of wear of the rewritable non-volatile memory module 406. For example, in response to an increase in program count, erase count, read count, and/or bit error rate, the memory management circuit 502 may determine that the degree of wear of the rewritable non-volatile memory module 406 has increased.

In an exemplary embodiment, the memory management circuit 502 may establish an n columns*i rows of two-dimensional array, such as array PB[n][i], to record the read count for multiple virtual management units included in the rewritable non-volatile memory module 406, as well as the read count for each of the physical blocks within each of the virtual management units. The n columns*i rows of two-dimensional array PB[n][i] may be an unsigned byte array of 1 byte in size, capable of storing integers between 0 and 255. Here, i represents the number of physical blocks included in each of the virtual management units, and n represents the maximum support count of the virtual management units that may be stored in the buffer memory used for temporarily storing read counts. The value of n is greater than or equal to 1 and less than or equal to the number of virtual management units, and both i and n are positive integers.

The memory management circuit 502 may designate the maximum read count for the physical block with the highest read count within the first virtual management unit among the multiple virtual management units as the read count for the first virtual management unit. In an exemplary embodiment, if the read count for the first virtual management unit is greater than or equal to a read count threshold, the memory management circuit 502 performs data relocation on the first virtual management unit. Alternatively, in another exemplary embodiment, if the read count for the first virtual management unit is greater than or equal to a read count threshold, the memory management circuit 502 checks whether the first virtual management unit is unable error correcting code (UECC).

Figure 7:
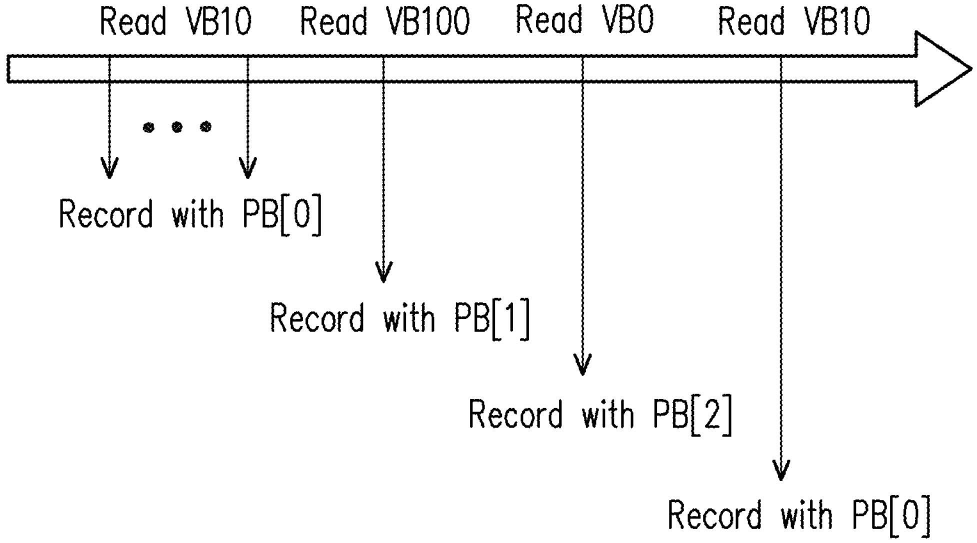
FIG. 7 is a schematic diagram showing recording a read count for a virtual management unit by using an array according to a first exemplary embodiment of the present disclosure.

FIG. 7 is a schematic diagram showing recording a read count for a virtual management unit by using an array according to a first exemplary embodiment of the present disclosure.

In the first embodiment, when the number of virtual management units for which read count is to be recorded is less than the maximum support count of the virtual management units, the memory management circuit 502 may utilize the i-th column of the array PB[n][i] to record the read count for the n+1-th read first virtual management unit, record the sequence number of the first virtual management unit, and update the read count for the first virtual management unit to the i-th column of the array based on the sequence number of the first virtual management unit.

As illustrated in FIG. 7, the memory management circuit 502 may utilize the array PB[0] (i.e., the 0-th column of the array) to record the count for the first read virtual management unit (VB10), utilize the array PB[1] (i.e., the 1st column of the array) to record the count for the second read virtual management unit (VB100), and utilize the array PB[2] (i.e., the 2nd column of the array) to record the count for the third read virtual management unit (VB0). When the virtual management unit (VB10) is read again, the memory management circuit 502 shall update the read count for the virtual management unit (VB10) and record the same in the array PB[0] (i.e., the 0-th column of the array).

Figure 8:
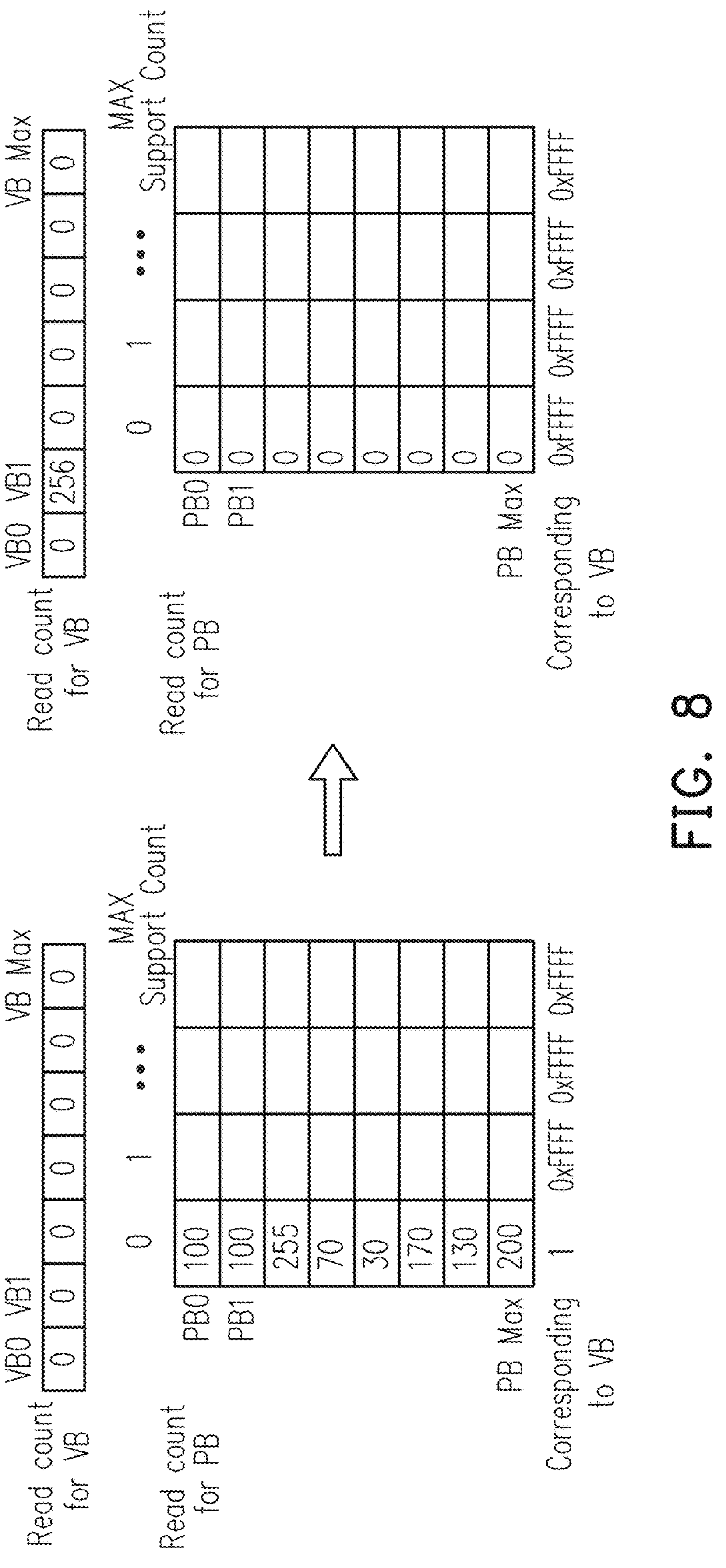
FIG. 8 is a schematic diagram showing recording a read count for a virtual management unit by using an array according to a second exemplary embodiment of the present disclosure.

FIG. 8 is a schematic diagram showing recording a read count for a virtual management unit by using an array according to a second exemplary embodiment of the present disclosure.

In the second embodiment, when the memory management circuit 502 utilizes the i-th column of the array to record the read count of the (n+1)-th read first virtual management unit, the memory management circuit 502 may employ the i-th row and i-th column of the array to record the read count for the i-th physical block of the first virtual management unit.

In the event that the read count recorded in the i-th row and i-th column of the array is greater than the array record threshold, the memory management circuit 502 shall update the read count recorded in the i-th row and i-th column to the read count for the first virtual management unit. Furthermore, the memory management circuit 502 shall clear the read counts for respective physical blocks of the first virtual management unit recorded in the i-th column of the array, and shall designate the first virtual management unit as the reference value. In the present embodiment, the two-dimensional array PB[n][i] may be an unsigned byte array of 1 byte in size, capable of storing integers between 0 and 255, thus enabling the array record threshold to be set at 255.

As shown in FIG. 8, the read count recorded in array PB [1][2] is 255, which means the read count for the second physical block PB2 of the first virtual management unit VB1 is 255. When the physical block PB2 is read again, the memory management circuit 502 increments the read count in the array PB[1][2] by 1 and updates the same to 256. At this point, the read count for the virtual management unit VB1 is updated to 256. Since the read count (256) for the virtual management unit VB1 is greater than the array record threshold (255), the memory management circuit 502 resets the read counts for all physical blocks (PB0 to PB Max) within the virtual management unit VB1 to zero. Additionally, the memory management circuit 502 sets the virtual management unit VB1 as a reference value, for example, setting the virtual management unit VB1 to 0×FFFF, indicating that virtual management unit VB1 is no longer used to record read counts.

In the present embodiment, the read count threshold may be set to 1024. At this juncture, the read count (256) for the virtual management unit VB1 has not reached the read count threshold (1024), and therefore will not trigger the memory management circuit 502 to execute UECC on the virtual management unit VB1. The read count threshold may be set or adjusted according to actual requirements, and the present disclosure is not limited in this regard.

When the read count for the virtual management unit VB1 is greater than or equal to the read count threshold, the memory management circuit 502 is triggered to perform UECC on the virtual management unit VB1. In an alternative embodiment, when the read count for the virtual management unit VB1 is greater than or equal to the read count threshold, the memory management circuit 502 is triggered to execute data relocation on the virtual management unit VB1. At this juncture, the respective physical blocks within the virtual management unit VB1 have undergone multiple rounds of data reading, effectively mitigating frequent triggering of the memory management circuit 502 to perform UECC on the virtual management unit VB1, thereby enhancing the processing efficiency of the memory management circuit 502.

Figure 9:
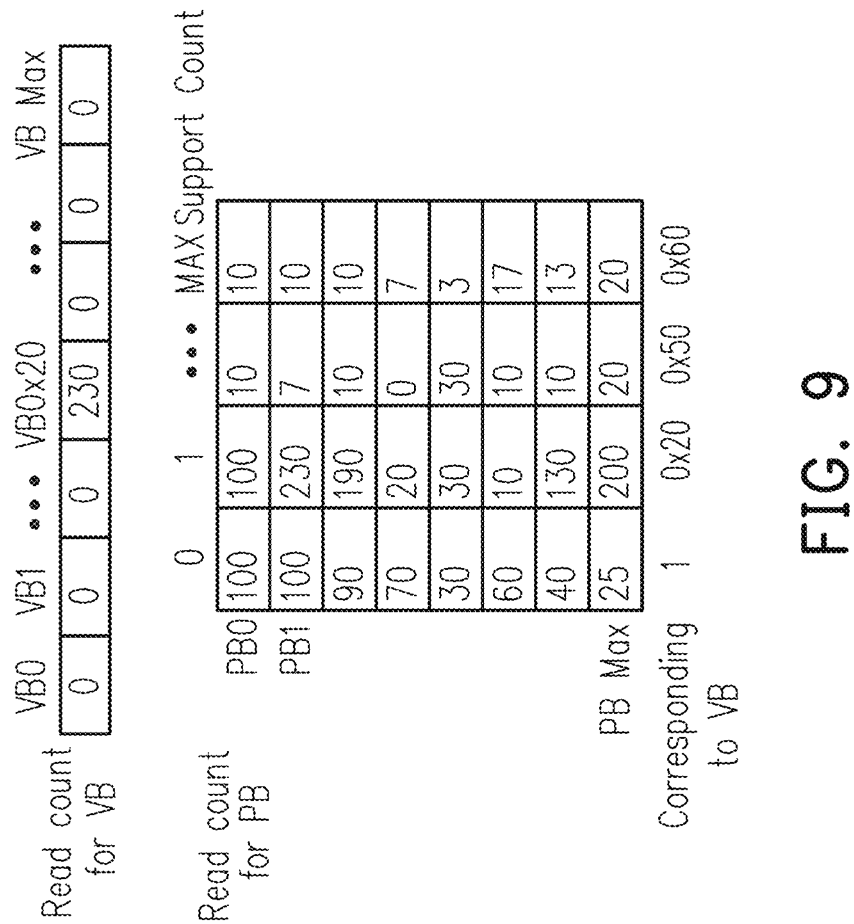
FIG. 9 is a schematic diagram showing recording a read count for a virtual management unit by using an array according to a third exemplary embodiment of the present disclosure.

FIG. 9 is a schematic diagram showing recording a read count for a virtual management unit by using an array according to a third exemplary embodiment of the present disclosure.

In the third embodiment, when the number of virtual management units requiring read count recording equals the maximum support count for the virtual management units, and a newly added virtual management unit VBN is read, the array PB[M] is selected among the array PB[0] to the array PB[MAX Support Count−1], where the array PB[M] contains the highest recorded read count. The memory management circuit 502 updates the highest read count in the array PB[M] to the read count for the corresponding virtual management unit, then resets the read counts for all physical blocks within the array PB[M] to zero, and the memory management circuit 502 utilizes the array PB[M] to record the read count for the respective physical blocks of the newly added virtual management unit VBN, wherein M is greater than or equal to 0 and less than or equal to n−1.

As illustrated in FIG. 9, when the number of virtual management units recording read counts equals the maximum support count for the virtual management units, and a newly added virtual management unit VBN is read simultaneously, since the array PB[1] contains the highest read count of 230, this read count of 230 is updated to the corresponding read count for the virtual management unit VB0×20. Subsequently, the read counts for all physical blocks in the array PB[1] are reset to zero. Consequently, the memory management circuit 502 utilizes the array PB[1] to record the read counts for various physical blocks for the newly added virtual management unit VBN.

In the above exemplary embodiment, when recording the read count, it is necessary to load the array into the buffer memory 510. Due to the space limitations of the buffer memory 510, the maximum support count of the virtual management units is limited. Utilizing an unsigned byte-type array to record the read count addresses the issue of improving the precision of read count recording while using minimal space. Furthermore, owing to the limited maximum support count of the virtual management units, in the event of reading a new virtual management unit (e.g., VBN), the memory management circuit 502 may reset all read counts in the array with the highest read count to zero, thereby facilitating the replacement of read counts for the respective physical blocks of the newly added virtual management unit VBN.

Figure 10:
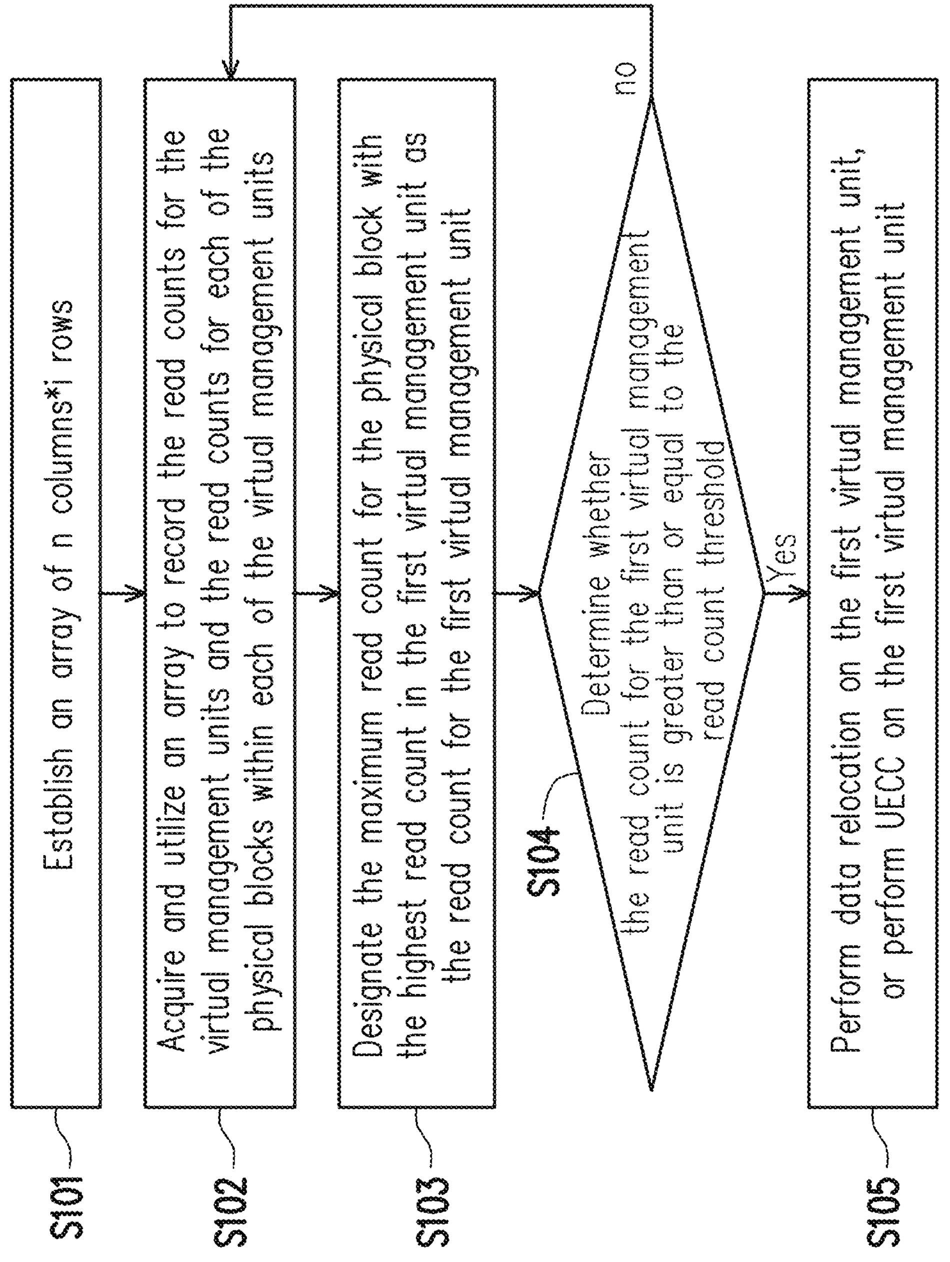
FIG. 10 is a flow chart of a memory control method according to an exemplary embodiment of the present disclosure.

FIG. 10 is a flow chart of a memory control method according to an exemplary embodiment of the present disclosure.

As illustrated in FIG. 10, in step S101, the memory management circuit 502 establishes an array of n columns*i rows, wherein i represents the number of physical blocks included in each of the virtual management units, and n denotes the maximum support count of the virtual management units of the buffer memory for temporarily storing read counts. The value of n is greater than or equal to 1 and less than or equal to the total number of the virtual management units, and both i and n are positive integers.

In step S102, the memory management circuit 502 acquires and utilizes an array to record the read counts for the multiple virtual management units and the read counts for each of the physical blocks within each of the virtual management units.

In step S103, the memory management circuit 502 designates the maximum read count for the physical block with the highest read count in the first virtual management unit among the multiple physical blocks as the read count for the first virtual management unit.

In step S104, the memory management circuit 502 determines whether the read count for the first virtual management unit is greater than or equal to the read count threshold. If the read count of the first virtual management unit is not greater than the read count threshold, the process proceeds to step S102.

In step S105, if the read count for the first virtual management unit is greater than or equal to the read count threshold, the memory management circuit 502 performs data relocation on the first virtual management unit, or perform UECC on the first virtual management unit.

Figure 11:
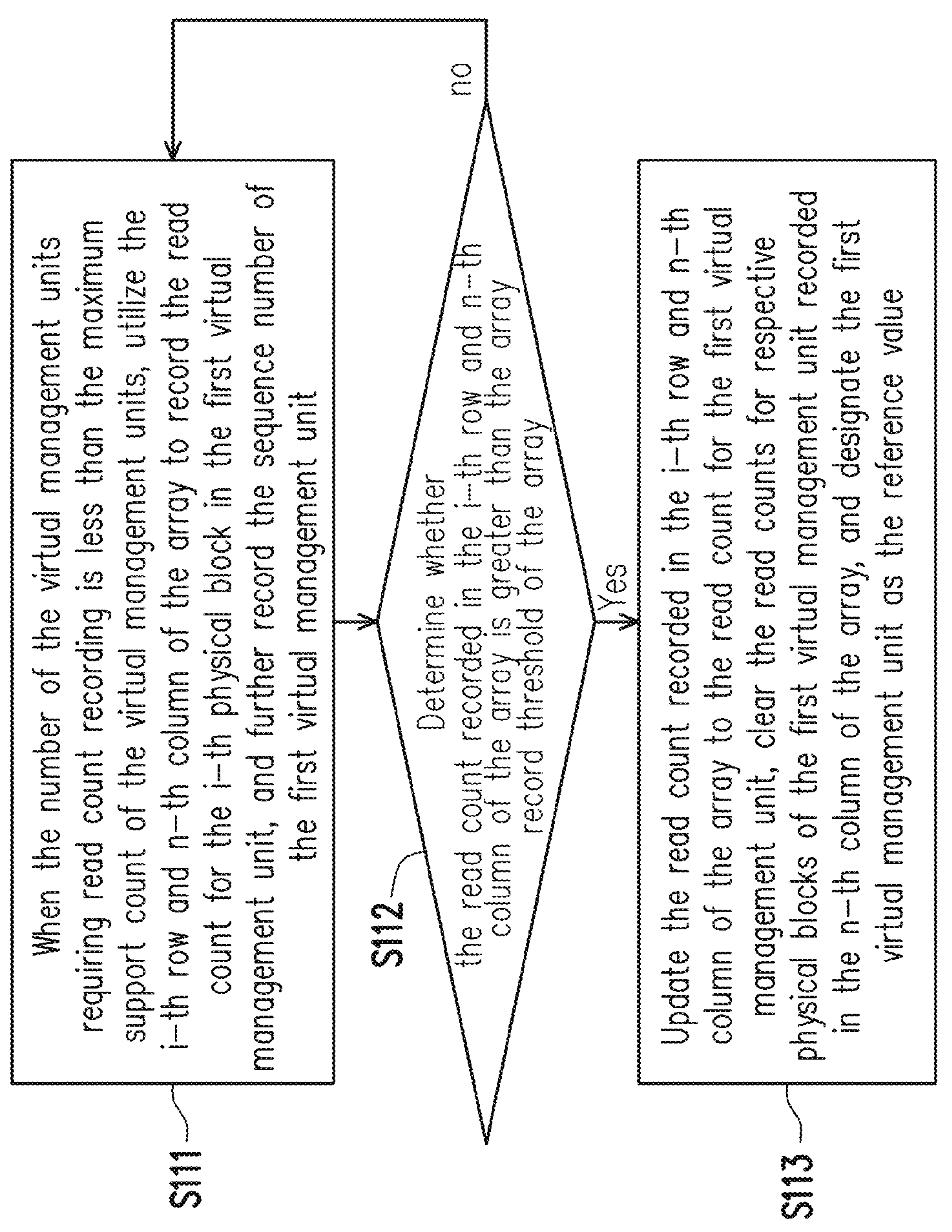
FIG. 11 is a flow chart of a memory control method according to a first exemplary embodiment of the present disclosure.

FIG. 11 is a flow chart of a memory control method according to a first exemplary embodiment of the present disclosure.

As shown in FIG. 11, in step S111, when the number of the virtual management units requiring read count recording is less than the maximum support count of the virtual management units, the memory management circuit 502 utilizes the i-th row and i-th column of the array to record the read count for the i-th physical block in the first virtual management unit, and further records the sequence number of the first virtual management unit.

In step S112, the memory management circuit 502 determines whether the read count recorded in the i-th row and i-th column of the array is greater than the array record threshold of the array. If the read count recorded in the i-th row and i-th column of the array is not greater than the array record threshold of the array, the process proceeds to step S111.

In step S113, if the read count recorded in the i-th row and i-th column of the array is greater than the array record threshold, the memory management circuit 502 updates the read count recorded in the i-th row and i-th column of the array to the read count for the first virtual management unit. Additionally, the memory management circuit 502 clears the read counts for respective physical blocks of the first virtual management unit recorded in the i-th column of the array, and designates the first virtual management unit as the reference value.

Figure 12:
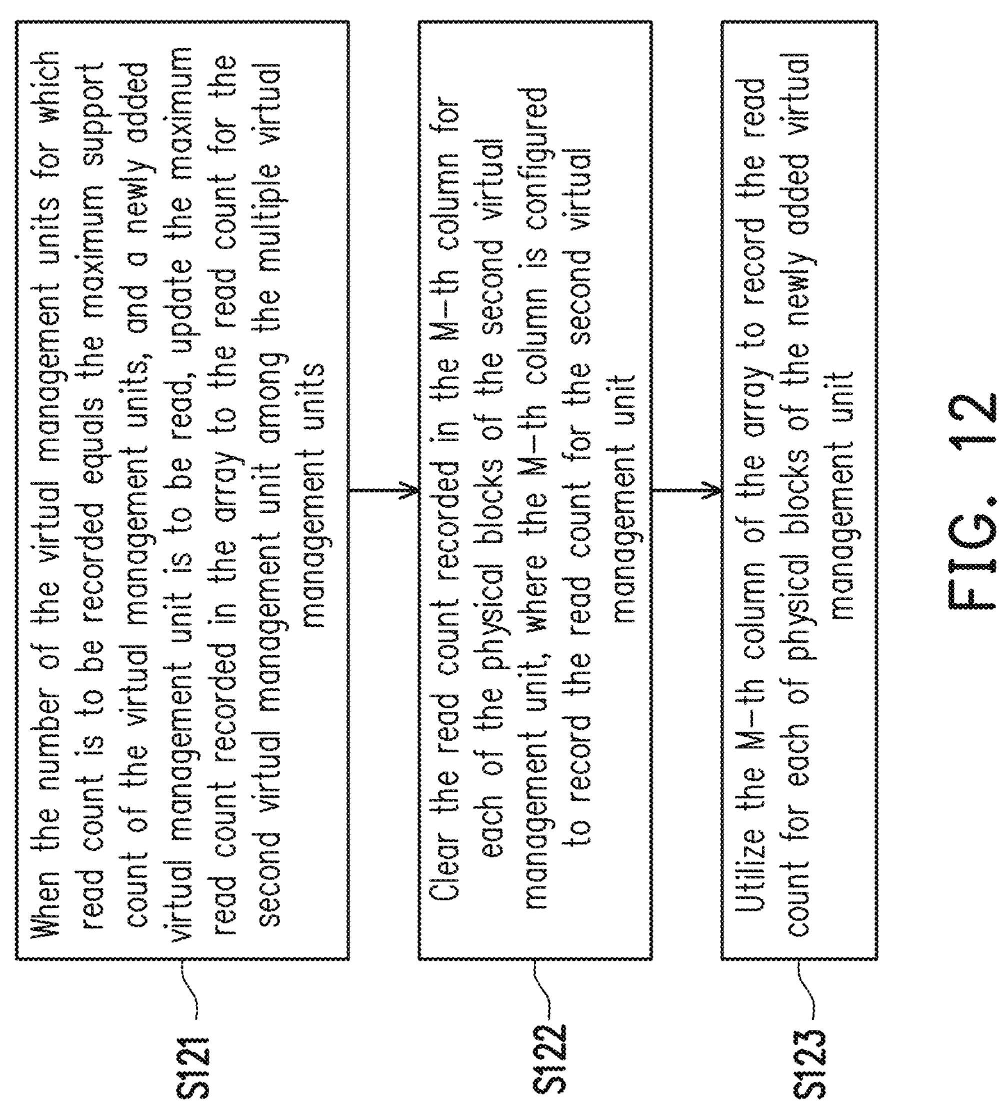
FIG. 12 is a flow chart of a memory control method according to a second exemplary embodiment of the present disclosure.

FIG. 12 is a flow chart of a memory control method according to a second exemplary embodiment of the present disclosure.

As illustrated in FIG. 12, in step S121, when the number of the virtual management units for which read count is to be recorded equals the maximum support count of the virtual management units, and a newly added virtual management unit is to be read, the memory management circuit 502 updates the maximum read count recorded in the array to the read count for the second virtual management unit among the multiple virtual management units.

In step S122, the memory management circuit 502 clears the read count recorded in the M-th column for each of the physical blocks of the second virtual management unit, where the M-th column is configured to record the read count for the second virtual management unit, wherein M is greater than or equal to 0 and less than or equal to n−1.

In step S123, the memory management circuit 502 utilizes the M-th column of the array to record the read count for each of physical blocks of the newly added virtual management unit.

However, as the steps depicted in FIG. 10 to FIG. 12 have been elaborately described above, they will not be reiterated herein. It is noteworthy that the steps illustrated in FIG. 10 to FIG. 12 may be implemented as multiple code segments or circuits, without limitation by the present disclosure. Furthermore, the methods presented in FIG. 10 to FIG. 12 may be employed in conjunction with the aforementioned exemplary embodiments or utilized independently, without restriction by the present disclosure.

In light of the foregoing, the exemplary embodiments of the present disclosure provide a memory control method, a memory storage device, and a memory control circuit unit, which not only effectively prevent frequent triggering of the memory management circuit to perform UECC on the virtual management units, or prevent frequent triggering of the memory management circuit to perform data relocation on the virtual management units, but also enhance the read performance of the flash memory device and extend the service life thereof.

It should be noted in conclusion that: The aforementioned embodiments are provided solely for the purpose of elucidating the technical solutions of the present disclosure and are not intended to be construed as limitations thereon. Although the present disclosure has been described in detail with reference to the foregoing embodiments, it should be understood by those skilled in the art that: they may still modify the technical solutions described in the foregoing embodiments, or substitute equivalent alternatives for part or all of the technical features thereof; and such modifications or substitutions shall not cause the essence of the corresponding technical solutions to deviate from the scope of the technical solutions of the embodiments of the present disclosure.

What is claimed is:

1. A memory control method for use in a memory storage device, the memory storage device comprising a rewritable non-volatile memory module, wherein the rewritable non-volatile memory module comprises a plurality of virtual management units, each of the plurality of virtual management units comprises a plurality of physical blocks, wherein the memory control method comprising:

acquiring and utilizing an array to record read counts for the plurality of virtual management units and a read count for each of the plurality of physical blocks within each of the plurality of virtual management units;

designating a maximum read count for the physical block with a highest read count within a first virtual management unit among the plurality of virtual management units as a read count for the first virtual management unit; and if the read count for the first virtual management unit is greater than or equal to a read count threshold, performing data relocation on the first virtual management unit, or checking whether the first virtual management unit is unable error correcting code (UECC).

2. The memory control method according to claim 1, wherein the memory control method further comprises:

establishing the array of n columns*i rows, wherein the i represents a number of the plurality of physical blocks comprised in each of the plurality of virtual management units, the n represents a maximum support count of a virtual management units of a buffer memory used for temporarily storing the read counts, the n is greater than or equal to 1 and less than or equal to a number of the plurality of virtual management units, and both the i and the n are positive integers.

3. The memory control method according to claim 2, wherein the array is a 1-byte unsigned byte array.

4. The memory control method according to claim 3, wherein the step of acquiring and utilizing the array to record the read counts for the plurality of virtual management units and the read count for each of the plurality of physical blocks within each of the plurality of virtual management units further comprises:

when the number of the virtual management units for which read count is to be recorded is less than the maximum support count of the virtual management units, utilizing an i-th column of the array to record a read count for the (n+1)-th read first virtual management unit among the plurality of virtual management units, and recording a sequence number of the first virtual management unit; and updating the read count for the first virtual management unit to the i-th column of the array based on the sequence number of the first virtual management unit.

5. The memory control method according to claim 4, wherein the step of acquiring and utilizing the array to record the read count for the plurality of virtual management units and the read count for each of the plurality of physical blocks within each of the plurality of virtual management units further comprises:

when utilizing the i-th column of the array to record the read count for the (n+1)-th read first virtual management unit among the plurality of virtual management units, utilizing an i-th row and i-th column of the array to record a read count for an i-th physical block among the plurality of physical blocks comprised in the first virtual management unit; and if the read count recorded in the i-th row and i-th column of the array is greater than an array record threshold of the array, updating the read count recorded in the i-th row and i-th column to the read count for the first virtual management unit, clearing the recorded read count for each of the plurality of physical blocks of the first virtual management unit in the i-th column of the array, and designating the first virtual management unit as a reference value.

6. The memory control method according to claim 3, wherein the step of acquiring and utilizing the array to record the read count for the plurality of virtual management units and the read count for each of the plurality of physical blocks within each of the plurality of virtual management units further comprises:

when the number of the virtual management units for which read count is to be recorded equals a maximum support count of the virtual management units, and a newly added virtual management unit is to be read, updating the maximum read count recorded in the array to a read count for a second virtual management unit among the plurality of virtual management units, clearing the read count for each of the plurality of physical blocks within the second virtual management unit recorded in an M-th column used to record the second virtual management unit, and utilizing the M-th column to record the read count for each of the plurality of physical blocks within the newly added virtual management unit, wherein the M is greater than or equal to 0 and less than or equal to n−1.

7. A memory storage device, comprising:

a connection interface unit, configured to connect to a host system;

a rewritable non-volatile memory module, wherein the rewritable non-volatile memory module comprises a plurality of virtual management units, each of the plurality of virtual management units comprises a plurality of physical blocks; and a memory control circuit unit, connected to the connection interface unit and the rewritable non-volatile memory module, wherein the memory control circuit unit is configured to acquire and utilize an array to record read counts for the plurality of virtual management units and a read count for each of the plurality of physical blocks within each of the plurality of virtual management units, wherein the memory control circuit unit is configured to designate a maximum read count for the physical block with a highest read count within a first virtual management unit among the plurality of virtual management units as a read count for the first virtual management unit, and if the read count for the first virtual management unit is greater than or equal to a read count threshold, the memory control circuit unit is configured to perform data relocation on the first virtual management unit, or the memory control circuit unit is configured to check whether the first virtual management unit is unable error correcting code (UECC).

8. The memory storage device according to claim 7, wherein the memory control circuit unit is further configured to:

establish the array of n columns*i rows, wherein the i represents a number of the plurality of physical blocks comprised in each of the plurality of virtual management units, the n represents a maximum support count of a virtual management units of a buffer memory used for temporarily storing the read counts, the n is greater than or equal to 1 and less than or equal to a number of the plurality of virtual management units, and both the i and the n are positive integers.

9. The memory storage device according to claim 8, wherein the array is a 1-byte unsigned byte array.

10. The memory storage device according to claim 9, wherein in the operation where the memory control circuit unit is configured to acquire and utilize the array to record the read counts for the plurality of virtual management units and the read count for each of the plurality of physical blocks within each of the plurality of virtual management units, when the number of the virtual management units for which read count is to be recorded is less than the maximum support count of the virtual management units, the memory control circuit unit is further configured to utilize an i-th column of the array to record a read count for the (n+1)-th read first virtual management unit among the plurality of virtual management units, and record a sequence number of the first virtual management unit, and the memory control circuit unit is further configured to update the read count for the first virtual management unit to the i-th column of the array based on the sequence number of the first virtual management unit.

11. The memory storage device according to claim 10, wherein in the operation where the memory control circuit unit is configured to acquire and utilize the array to record the read count for the plurality of virtual management units and the read count for each of the plurality of physical blocks within each of the plurality of virtual management units, when utilizing the i-th column of the array to record the read count for the (n+1)-th read first virtual management unit among the plurality of virtual management units, the memory control circuit unit is further configured to utilize an i-th row and i-th column of the array to record a read count for an i-th physical block among the plurality of physical blocks comprised in the first virtual management unit, and if the read count recorded in the i-th row and i-th column of the array is greater than an array record threshold of the array, the memory control circuit unit is further configured to update the read count recorded in the i-th row and i-th column to the read count for the first virtual management unit, clear the recorded read count for each of the plurality of physical blocks of the first virtual management unit in the i-th column of the array, and designate the first virtual management unit as a reference value.

12. The memory storage device according to claim 9, wherein in the operation where the memory control circuit unit is configured to acquire and utilize the array to record the read count for the plurality of virtual management units and the read count for each of the plurality of physical blocks within each of the plurality of virtual management units, when the number of the virtual management units for which read count is to be recorded equals a maximum support count of the virtual management units, and a newly added virtual management unit is to be read, the memory control circuit unit is further configured to update the maximum read count recorded in the array to a read count for a second virtual management unit among the plurality of virtual management units, clear the read count for each of the plurality of physical blocks within the second virtual management unit recorded in an M-th column used to record the second virtual management unit, and utilize the M-th column to record the read count for each of the plurality of physical blocks within the newly added virtual management unit, wherein the M is greater than or equal to 0 and less than or equal to n−1.

13. A memory control circuit unit, comprising:

a host interface, configured to connect to a host system;

a memory interface, connected to a rewritable non-volatile memory module, wherein the rewritable non-volatile memory module comprises a plurality of virtual management units, each of the plurality of virtual management units comprises a plurality of physical blocks; and a memory management circuit, connected to the host interface and the memory interface, wherein the memory management circuit is configured to acquire and utilize an array to record read counts for the plurality of virtual management units and a read count for each of the plurality of physical blocks within each of the plurality of virtual management units, wherein the memory management circuit is configured to designate a maximum read count for the physical block with a highest read count within a first virtual management unit among the plurality of virtual management units as a read count for the first virtual management unit; and if the read count for the first virtual management unit is greater than or equal to a read count threshold, the memory management circuit is configured to perform data relocation on the first virtual management unit, or the memory management circuit is configured to check whether the first virtual management unit is unable error correcting code (UECC).

14. The memory control circuit unit according to claim 13, wherein the memory management circuit is further configured to, establish the array of n columns*i rows, wherein the i represents a number of the plurality of physical blocks comprised in each of the plurality of virtual management units, the n represents a maximum support count of a virtual management units of a buffer memory used for temporarily storing the read counts, the n is greater than or equal to 1 and less than or equal to a number of the plurality of virtual management units, and both the i and the n are positive integers.

15. The memory control circuit unit according to claim 14, wherein the array is a 1-byte unsigned byte array.

16. The memory control circuit unit according to claim 15, wherein in the operation where the memory management circuit is configured to acquire and utilize the array to record the read counts for the plurality of virtual management units and the read count for each of the plurality of physical blocks within each of the plurality of virtual management units, when the number of the virtual management units for which read count is to be recorded is less than a maximum support count of the virtual management units, the memory management circuit is further configured to utilize an i-th column of the array to record a read count for the (n+1)-th read first virtual management unit among the plurality of virtual management units, and record a sequence number of the first virtual management unit, and the memory management circuit is further configured to update the read count for the first virtual management unit to the i-th column of the array based on the sequence number of the first virtual management unit.

17. The memory control circuit unit according to claim 16, wherein in the operation where the memory management circuit is configured to acquire and utilize the array to record the read count for the plurality of virtual management units and the read count for each of the plurality of physical blocks within each of the plurality of virtual management units, when utilizing the i-th column of the array to record the read count for the (n+1)-th read first virtual management unit among the plurality of virtual management units, the memory management circuit is further configured to utilize an i-th row and i-th column of the array to record a read count for an i-th physical block among the plurality of physical blocks comprised in the first virtual management unit; and if the read count recorded in the i-th row and i-th column of the array is greater than an array record threshold of the array, the memory management circuit is further configured to update the read count recorded in the i-th row and i-th column to the read count for the first virtual management unit, clear the recorded read count for each of the plurality of physical blocks of the first virtual management unit in the i-th column of the array, and designate the first virtual management unit as a reference value.

18. The memory control circuit unit according to claim 15, wherein in the operation where the memory management circuit is configured to acquire and utilize the array to record the read count for the plurality of virtual management units and the read count for each of the plurality of physical blocks within each of the plurality of virtual management units, when the number of the virtual management units for which read count is to be recorded equals the maximum support count of the virtual management units, and a newly added virtual management unit is to be read, the memory management circuit is further configured to update the maximum read count recorded in the array to a read count for a second virtual management unit among the plurality of virtual management units, clear the read count for each of the plurality of physical blocks within the second virtual management unit recorded in an M-th column used to record the second virtual management unit, and utilize the M-th column to record the read count for each of the plurality of physical blocks within the newly added virtual management unit, wherein the M is greater than or equal to 0 and less than or equal to n−1.

* * * * *